Figure 1:
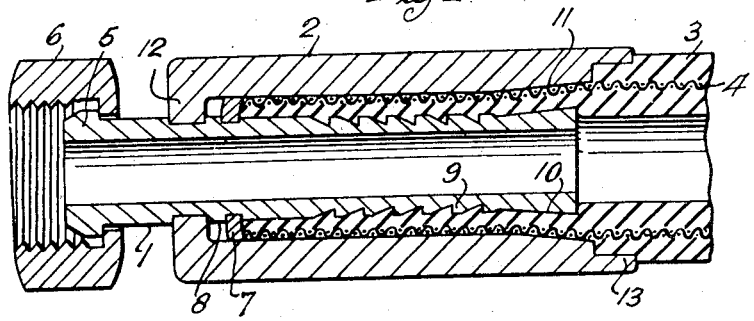

Nov. 2, 1948.  E. C. CARLING  2,452,728
COUPLINGS FOR FLEXIBLE HOSE
Filed Dec. 23, 1944

Inventor:
Edward C. Carling,
By his attorneys,
Baldwin & Wight

Patented Nov. 2, 1948

2,452,728

UNITED STATES PATENT OFFICE 2,452,728

COUPLINGS FOR FLEXIBLE HOSE

Edward Charles Carling, Stoke Newington, London, England

Application December 23, 1944, Serial No. 569,615

4 Claims. (Cl. 285—84)

This invention relates to hose end fittings for providing couplings for flexible hose and especially flexible hose consisting of rubber (or rubber-like material hereinafter termed rubber) having embedded metal braid or other metal reinforcement.

The main object of this invention is to provide such a method of and arrangement for securing a hose end fitting to braided hose as will provide a secure fluid-tight connection capable of withstanding vibration in use and capable of use in conveying fluids at high pressure.

These end fittings commonly include a tubular metal insert fitted in the end of the bore of the hose and a metal sleeve or ferrule fitted over the outer surface of the end of the hose the insert being formed at its outer end (i. e. beyond the hose end) one part of a coupling.

Now, according to this invention, the end of the hose is reduced to the braid embedded in it (i. e. the outer covering of rubber over the braid is removed to expose the braid), the bore of the sleeve being such as to fit in assembly more or less snugly over the braid and in addition the insert is formed or provided towards its outer end with a metal abutment (such as a washer) which is opposed to the end of the rubber: after the parts have been assembled, the sleeve is reduced in diameter in a direction along the sleeve towards the abutment (as by being forced through a reducing die) so that the inner surface of the sleeve is contracted on to the metal braid and the rubber trapped between the braid (and sleeve) and the insert is caused to flow towards the abutment which exercises restraint depending upon its strength: due to this restraint, the rubber is caused to engage the insert securely, and for the purpose of increasing the grip of rubber to insert this latter may be keyed on its outer surface.

Obviously the rubber trapped between the insert and the sleeve will act and re-act due to the reduction in sleeve diameter so that not only is the rubber firmly keyed to the insert but also to the braid which becomes keyed to the sleeve.

In order further to secure the insert in the hose, the insert can be provided at its inner end with a protuberance which when the insert is fitted on assembly in the hose end causes a local bulge in the hose: the sleeve and the insert are so formed in relation to one another that the reduction of the sleeve brings a surface thereon in opposition to the bulge so that the insert is prevented from "pulling-out" of the hose end.

It is also preferred that, in the reducing operation on the sleeve, it is caused to interlock with the insert so positively preventing the two parts from moving relatively to one another and providing still further security.

Figure 2:
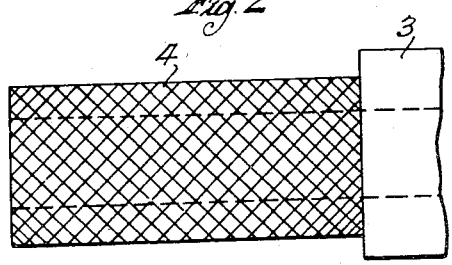
Figure 3:
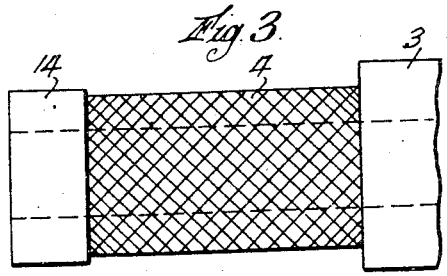

The invention is illustrated in the accompanying drawing in which Fig. 1 is a longitudinal section showing an end fitting secured to the end of a hose, Fig. 2 is an elevation showing the hose end prepared for making a joint, and Fig. 3 an elevation showing a modified method of preparing the hose end.

Referring now to the drawing, 1 indicates a tubular metal insert, 2 a metal sleeve and 3 the rubber hose with its metal braid 4 which may consist of one or more layers.

The outer end of the insert 1 is formed in any customary manner with one part of a hose coupling: as shown this part comprises a flange 5 to mate with the other part of the coupling, the flange providing an abutment to a flanged nut 6 which, by being screwed on to the other part of the coupling, draws the two parts of the coupling into firm engagement.

In carrying this invention, the end of the hose 3 is prepared as shown in Fig. 2 by removing the outer rubber covering of the braid 4 so as to expose the braid: the sleeve 2 is passed on to the insert and a metal washer 7 is threaded on to the insert up to a limiting shoulder 8 formed on the insert 1: the prepared end of the hose is then inserted in the space between the insert and sleeve, it being obvious that the washer 7 will be opposed to the end of the hose.

When the parts have been thus assembled, the sleeve 2 is forced through a reducing die which reduces the diameter of the sleeve: this reducing operation is effected progressively from the inner end of the assembly (i. e. from right to left as seen in the drawing). This operation causes a reduction of the radial dimension of the outer diameter of the annulus between the insert 1 and the sleeve 2, and, the reduction being effected progressively along the sleeve 2 towards the washer 7, the rubber is first trapped at its inner part (i. e. at the braid-exposed end remote from the washer 7) and then is caused to flow up to the washer 7 which is held against movement by the shoulder 8. This washer will resist the flow to an extent determined by its resistance to distortion and hence will react and cause the rubber to react radially and so make firm engagement with the insert and press the braid into firm engagement with the inner surface of the sleeve.

The outer surface of the insert 1 is provided with buttress teeth 9 which afford a key for the rubber to the insert: in order also to hold the insert 1 even more firmly in the hose, the inner end of the insert can be formed with a slight protuberance 10 which is of tapered form as shown, and the corresponding end of the sleeve 2 is formed with an internal mating taper 11: due to the reduction in the sleeve diameter the taper 11 moves down in relation to the protuberance 10 and operates through the cables trapped between the two tapers to afford an abutment opposing the "pulling" of the insert 1 from the hose.

The sleeve 2 is caused, during the reduction, to enter into inter-locking engagement with the insert for which purpose the outer end of the sleeve is turned over at 12 to form a flange and the adjacent part of the insert 1 is formed with a recess: this recess is positioned so that, due to the extension in length of the sleeve 2 and its reduction in diameter in the reducing operation, the flange 12 will be forced into the recess and so effect the desired interlock preventing the insert 1 and sleeve 2 from moving relatively in a longitudinal direction. In addition by making the washer 7 a more or less snug fit in the bore of the sleeve 2 before it is reduced, and by providing in the insert 1 a second recess in register with the washer then in the reduction of the sleeve 2, its inner surface becomes firmly locked to the washer 7 at its outer periphery and the inner periphery is forced into the second recess and so locked in position.

As is shown in Fig. 1, the inner end of the sleeve 2 is counter-bored at 13 to receive a short length of the unreduced end of the hose 3. Due to the reduction of the sleeve 2, the inner surface of the counter-bore will of course be reduced and so will make firm contact with the hose preventing the ingress of dirt and affording a good "weathering" finish to the hose-end fitting.

The inner surface of the sleeve 2 may be roughened or provided with buttress teeth to key to the plaits of the braid such teeth being if desired, produced by cutting a helical groove in the surface so that in effect a screw thread having buttress shape teeth is formed.

Referring now to Fig. 3 this illustrates a modified manner of preparing the hose end to avoid any difficulty which might arise (in inserting the prepared hose end into the sleeve 2 on assembly) due to the splaying-out of the ends of the metal strands constituting the braid. In this modification, a thin layer 14 of the rubber is left on the extreme end of the hose to bind the loose strands together and so prevent them from splaying out.

What I claim is:
1. The method of securing the sleeve and insert of an end fitting to a braided rubber hose which comprises removing the outer covering of rubber on the braid at an end of the hose, so providing a metal abutment extending between the sleeve and insert that the abutment is positioned against axial movement in a direction away from the inner end of the insert but is free to deform, the insert and the sleeve having surfaces to interlock in introducing the prepared end of the hose between the sleeve and insert and up to the abutment, and in then progressively reducing the sleeve in a direction towards the abutment to secure the hose in position and to bring the interlocking surfaces into position to lock the sleeve and insert to one another.

2. In combination, a tubular insert, a tubular sleeve, a deformable metal abutment, means positioning the abutment on the insert against bodily axial movement at least in a direction away from the inner end of the insert, the abutment extending between the insert and the sleeve with a part of the abutment being free from positive restraint against movement in said direction by deformation of the abutment, a braided rubber hose the end of which has the outer covering of rubber removed to expose the braid, the said exposed part being held between the insert and sleeve up to the abutment by reduction in the sleeve after assembly of the parts and said deformable abutment reacting against said exposed rubber part, and mutually interlocking surfaces on the insert and the sleeve for positively preventing relative axial movement between the insert and the sleeve.

3. In combination, a tubular insert, a tubular sleeve having interlocking surfaces, a deformable metal abutment, means positioning the abutment on the insert against bodily axial movement at least in a direction away from the inner end of the insert, the abutment extending between the insert and the sleeve with a part of the abutment being free from positive restraint against movement in said direction by deformation of the abutment, and a braided rubber hose the end portion of which has the outer covering of rubber removed to expose the braid except for the extreme end of the hose where a thin layer of rubber is left, the said exposed part being held between the insert and sleeve up to the abutment by reduction in the sleeve after assembly of the parts and said deformable abutment reacting against said exposed rubber part.

4. In combination, a tubular insert, spaced peripheral recesses in said insert, a tubular sleeve of cup-shaped form having a central opening to receive the insert and providing a flange extending into one of said recesses, a deformable metal abutment having a central opening, the wall of which enters the other of said recesses to anchor the washer to the insert, and a braided rubber hose having the braid at its end exposed and that end trapped between the insert and sleeve with its extremity against the abutment.

EDWARD CHARLES CARLING.

REFERENCES CITED

The following references are of record in the file of this patent:

UNITED STATES PATENTS

| Number | Name | Date |
|---|---|---|
| 314,066 | Sergeant | Mar. 17, 1885 |
| 585,014 | Wenzel | June 22, 1897 |
| 1,752,976 | Cowles | Apr. 1, 1930 |
| 1,994,784 | Porzel | Mar. 19, 1935 |
| 2,054,362 | Cowles | Sept. 15, 1936 |
| 2,273,398 | Couty et al. | Feb. 17, 1942 |
| 2,279,437 | Beugler | Apr. 14, 1942 |
| 2,320,579 | Eisenbeis | June 1, 1943 |
| 2,328,013 | Hattan | Aug. 31, 1943 |

FOREIGN PATENTS

| Number | Country | Date |
|---|---|---|
| 557,580 | Great Britain | Nov. 26, 1943 |
| 449,042 | Great Britain | June 19, 1936 |